United States Patent [19]

Junji et al.

[11] Patent Number: 5,024,505

[45] Date of Patent: Jun. 18, 1991

[54] ARRAY SPLICE FOR RIBBON-LIKE MULTI-CORE OPTICAL FIBERS

[76] Inventors: Junji Fujikawa 1460-63, Oaza Minamizakura, Yasu-cho, Yasu-gun, Siga-ken; Fumiaki Tamura, 220, Ogawa, Notogawa-cho, Kanzaki-gun, Siga-ken, both, Japan

[21] Appl. No.: 474,952

[22] Filed: Feb. 5, 1990

[30] Foreign Application Priority Data

Feb. 10, 1989 [JP] Japan ............................. 1-15112[U]

[51] Int. Cl.$^5$ ............................. G02B 6/26; G02B 6/40
[52] U.S. Cl. ............................. 350/96.22; 350/96.20
[58] Field of Search ............. 350/96.20, 96.21, 96.22

[56] References Cited

U.S. PATENT DOCUMENTS

| | | | |
|---|---|---|---|
| 4,629,284 | 12/1986 | Malavieille | 350/96.21 |
| 4,750,804 | 6/1988 | Osaka et al. | 350/96.22 X |
| 4,854,661 | 8/1989 | Cooper et al. | 350/96.20 |

Primary Examiner—Akm Ullah

[57] ABSTRACT

An array splice for ribbon-like multi-core optical fibers comprises capillary tubes of ultraviolet-transmitting glass each having an inner diameter slightly larger than the outer diameter of the clad of an optical fiber, each glass capillary tube including tapered portions on the opposite ends thereof for insertion of optical fiber bodies, and a groove formed in the middle upper surface region thereof for discharging bubbles and adhesive agent, and a base including recesses formed in the middle upper surface region thereof for receiving and supporting the lower portions of the tube walls of the glass capillary tubes, and a plurality of front-edged separators each disposed at the opposite ends of the associated receiving and supporting recess. The separators are disposed with approximately the same pitch as that for the capillary tubes. Defined between adjacent separators are optical fiber insertion paths having a width which increases with increasing distances from the opposite ends of each capillary tube.

4 Claims, 3 Drawing Sheets

ARRAY SPLICE FOR RIBBON-LIKE MULTI-CORE OPTICAL FIBERS

BACKGROUND OF THE INVENTION

1. Field of the Invention

The present invention relates to an array splice for ribbon-like multi-core optical fibers and particularly to an array splice for multi-core optical fibers with the use of an ultraviolet-curing adhesive agent taken into consideration.

2. Description of the Prior Art

Splices for optical fibers having such features as low loss, long distance transmission, large-capacity transmission, no electromagnetic induction, small diameter, and explosion-proof property are used in large-capacity basic trunk lines for long distance including submarine cables, local inter-office trunk lines, inter-office and subscriber's transmission systems, power systems for communications only, monitor control circuits for railways and superhighways, and computer networks.

An optical fiber 4, as shown in FIG. 6, has a construction in which a glass core 1 having a diameter of about 10 $\mu$m or about 50 $\mu$m and a glass clad 2 having an outer diameter of about 125 $\mu$m and concentrically surrounding said core are covered with a silica glass jacket member 3 having an outer diameter of about 250 $\mu$m or about 900 $\mu$m, the refractive index of the core 1 being somewhat higher than that of the clad 2 so as to provide a total reflection type optical path which prevents light from leaking through the core. This optical fiber is in the form of either a single-core type optical fiber consisting of a single optical fiber or a multi-core type optical fibers consisting of a plurality of optical fibers gathered together in ribbon form.

In connecting optical fibers 4 together, the axes of the cores are aligned with each other to minimize connection loss and in this condition the optical fibers are positioned and fixed on a splice and use is made of such bonding medium as an ultraviolet-curing adhesive agent. In the case where the optical fiber 4 is in the form of a ribbon-like multi-core optical fibers, a base 6 having a plurality of parallel V-shaped grooves 5 is used as a splice (see FIG. 7).

In the case where the aforesaid base 6 having V-shaped grooves 5 is used, in order to decrease connection loss it is necessary that the optical fibers 4 be positioned and fixed on the base 6 so that the clads 2 of the optical fibers 4 having their jacket members 3 stripped are closely contacted with the bottoms of said V-shaped grooves 5. However, to correctly position and fix the individual optical fibers 4 in the V-shaped grooves 5, it is necessary to adjust the relative position of engagement between the individual optical fibers 4 and the V-shaped grooves 5 to ensure a uniform push-in pressure over the entire length of the optical fibers 4. However, since the optical fibers 4 have a small diameter, the positioning and fixing often tend to be unstable and the butted front ends of the optical fibers often tend to escape from the bottoms of the V-shaped grooves 5 to a space on the opposite side; thus, minimization of connection loss of optical fibers has been greatly limited.

For the purpose of solving the aforesaid problem, the applicant of the present invention previously proposed, in Japanese Patent Application No. 188663/1988, the use of a glass capillary tube 8 with an adhesive agent discharging groove 7 formed in the lengthwise middle portion thereof as a positioning and fixing jig or connecting member for optical fibers (see FIGS. 8 and 9). The use of this capillary tube type splice makes it possible to secure the positioning and fixing conditions which substantially prevent occurrence of connection loss between two optical fibers 4. In the case where optical fibers are in the form of multi-core optical fibers 10 each comprising a plurality of optical fibers joined together in ribbon form as shown in FIG. 10, however, smooth insertion of the optical fibers 4 has been very difficult since the diameter of the optical fiber insertion ports of the glass capillary tubes is small.

SUMMARY OF THE INVENTION

The invention provides an array splice for ribbon-like multi-core optical fibers, comprising capillary tubes of ultraviolet-transmitting glass each having an inner diameter slightly larger than the outer diameter of the clad of an optical fiber, and including tapered portions on the opposite ends thereof for insertion of optical fibers, and a groove formed in the middle upper surface region thereof for discharging bubbles and adhesive agent, and a base including recesses formed in the middle upper surface region thereof for receiving and supporting the lower portions of the tube walls of said glass capillary tubes, and a plurality of front-edged separators each disposed at the opposite ends of the associated receiving and supporting recess, said separators being disposed with approximately the same pitch as that for the capillary tubes, wherein defined between adjacent separators are optical fiber insertion paths having a width which increases with increasing distances from the opposite ends of each capillary tube.

The invention also provides an array splice for ribbon-like multi-core optical fibers, characterized in that said base has an H-shaped cross-section, with a groove formed in the middle portion thereof which serves as a guide for guiding a pressing jig as the latter advances when said glass capillary tubes are to be bonded.

When the cores and clads of multi-core optical fibers are to be inserted into glass capillary tubes, the lower portions of the glass capillary tubes are supported in the receiving and supporting recesses formed in the base. Therefore, the optical fibers smoothly slide into the tapered portions formed on the opposite ends of the associated glass capillary tube through the insertion paths separated by the separators and having a width gradually decreasing in the direction of advance of the optical fibers.

Further, the formation of the cross section of the base in H shape prevents the warping or deformation of said base during formation of said base and ensures that when a groove for discharging bubbles and adhesive agent is formed in the middle upper surface region of each of the glass capillary tubes adhesively fixed on the base, the depth of such grooves is within a predetermined allowance.

After the optical fibers have been inserted into the glass capillary tubes, the two optical fibers, now positioned end to end, are joined together by an ultraviolet-curing adhesive agent. In this case, a pressing jig descends along the groove formed in the middle of the base to hold down the glass capillary tubes. Thereby, the floating of the glass capillary tubes due to the ultraviolet-curing adhesive agent flowing out of said discharging groove is prevented and the optical fibers are simultaneously connected together in concentric end-to-end relation.

DESCRIPTION OF THE PREFERRED EMBODIMENTS

Figure 1:
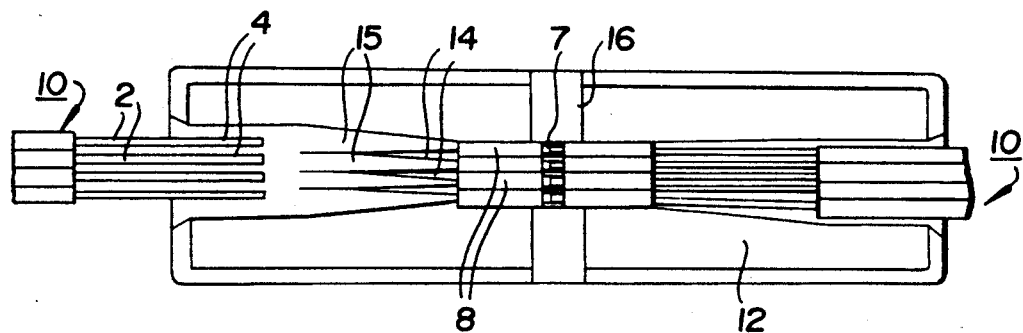
FIG. 1 is a plan view showing a device according to an embodiment of the present invention.
Figure 2:
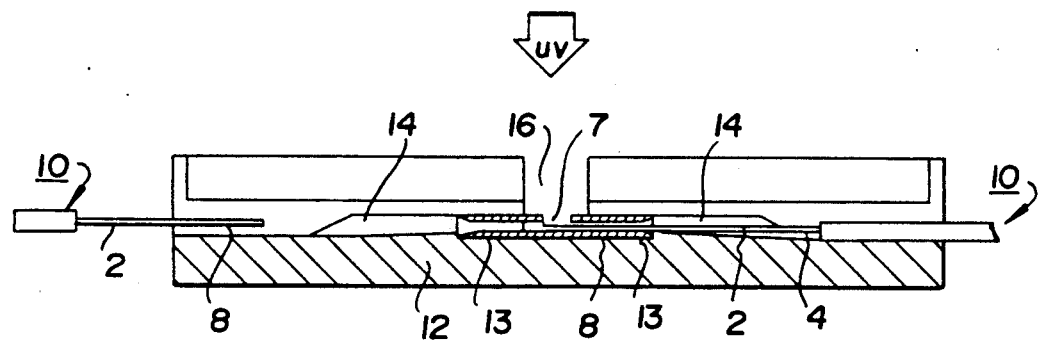
FIG. 2 is a front view partly in section.
Figure 7:
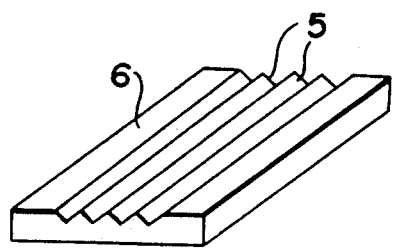
FIG. 7 is a perspective view of a conventional array splice.
Figure 3:
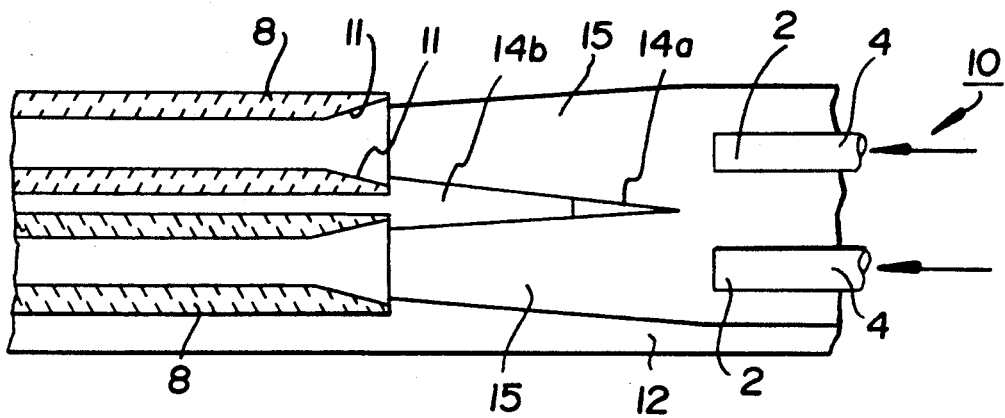
FIG. 3 is an enlarged plan view of the principal portion of the device of the present invention.

In the following description, the same structural parts as those found in FIGS. 6 through 10 employed for explaining the prior art are denoted by the same reference numerals, and repetitive explanation will be omitted.

Figure 10:
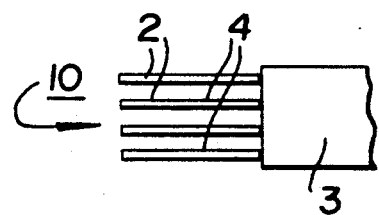
FIG. 10 is a perspective view of the principal portion of a ribbon-like multi-core optical fibers.
Figure 6:
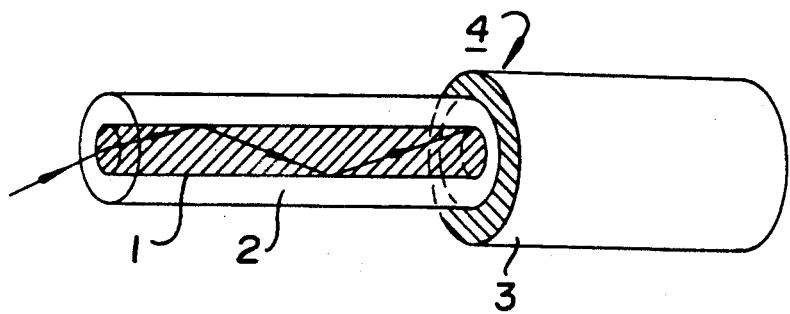
FIG. 6 is a perspective view of the principal portion of an optical fiber.

A multi-core optical fibers 10 comprises four quartz glass optical fibers 4 having a diameter of 125 μm and a jacket member 3 in which said fibers 4 are gathered together for integration in ribbon form (see, FIG. 10). The cores 1 and clads 2 which are to be connected are inserted into glass capillary tubes 8 after the portion of the jacket member 3 covering them has been stripped.

The capillary tubes 8 are made from an ultraviolet-transmitting glass material, for example, borosilicate glass, and in the case where the clads 2 of the multi-core optical fibers 10 have a diameter of 125 μm, the capillary tubes 8 have a slightly larger inner diameter, for example, of 126 μm. By immersing the respective opposite ends of the capillary tubes in a glass-etching solution for a predetermined time, tapered portions 11 for introducing optical fibers 4 are formed. Further, a groove 7 for discharging bubbles and adhesive agent is formed in the middle upper surface region of each capillary tube by using a cutter or drill. Before the glass capillary tubes 8 are fixed to a base 12 to be later described, they are filled with an ultraviolet-curing adhesive agent whose refractive index matches with that of the cores 1 of the optical fibers 4 or a matching gel whose refractive index matches with that of the optical fibers. To prevent said ultraviolet-curing adhesive agent from curing prior to insertion of the optical fibers 4, the glass capillary tubes filled with said ultraviolet-curing adhesive agent is wrapped with a light-tight packaging material and kept in the wrapped state until the optical fibers 4 are to be inserted.

Figure 4:
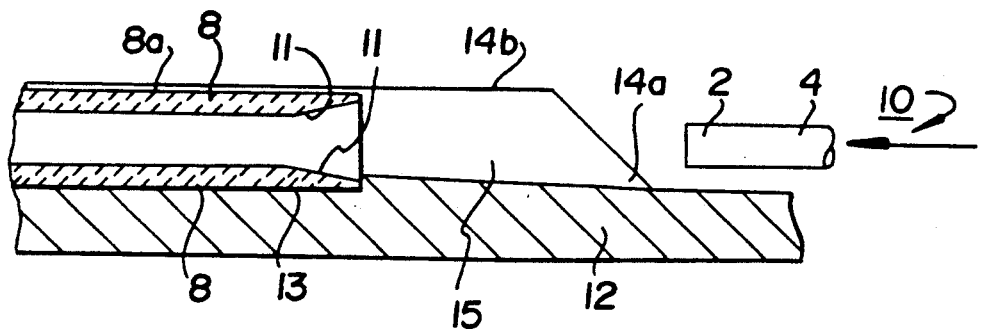
FIG. 4 is an enlarged front view.
Figure 5:
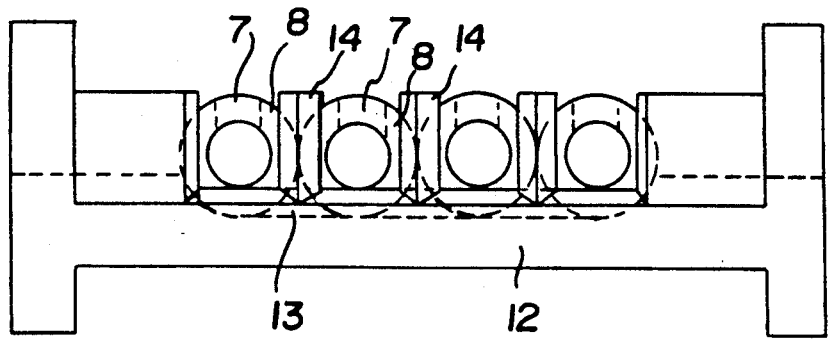
FIG. 5 is an enlarged side view.
Figure 8:
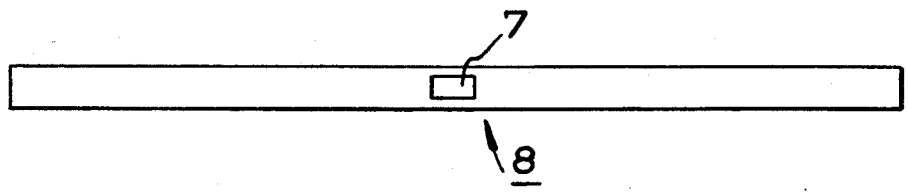
FIG. 8 is a top view of a glass capillary tube.
Figure 9:
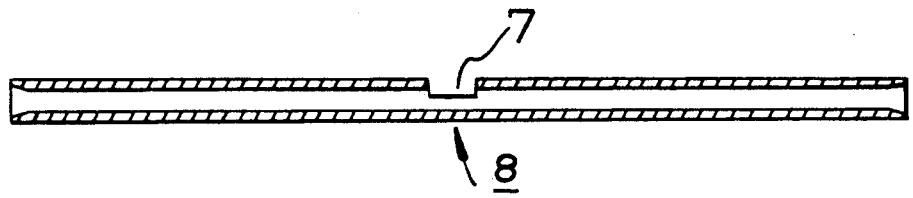
FIG. 9 is a longitudinal sectional view thereof.

On the other hand, the base 12 is made from a material having a low linear expansion coefficient, such as silicone, ceramic or plastic material, to prevent warping or deformation during formation, and is in the form of a plate member of H-shaped cross section. It is formed in the middle upper surface region thereof with recesses 13 for receiving and supporting the lower portions of the tube walls of said glass capillary tubes, while a plurality of separators 14 having edged ends 14a and arranged with substantially the same predetermined pitch as that for the glass capillary tubes extend upward from and fixed to the respective lengthwise opposite ends of said receiving and supporting recesses 13. The distance between two adjacent separators 14 is determined on the basis of the outer diameter of the clad 2 of the optical fiber 4. In this connection, to facilitate insertion of the optical fibers 4 into the glass capillary tubes 8, the width of insertion paths 15 for optical fibers 4 defined between said separators 14 is gradually increased as the distances from the respective opposite ends of the glass capillary tubes 8 increase. To prevent the optical fibers 4 from going out above said insertion paths 15 when they are inserted along the front-edged separators 14, the top surfaces 14b of the separators 14 are located above the level of the upper surfaces 8a of the glass capillary tubes 8 fixed on the base 12 (see FIG. 4).

On the other hand, the lengthwise middle region of the upper surface of the base 12 is formed with a groove 16. This groove 16 functions as a guide for guiding a pressing jig (not shown) when the glass tubes 8 are fitted in the recesses 13 formed in the upper surface of the base 12 and adhesively fixed therein. The floating of the glass capillary tubes 8 due to the adhesive agent is prevented by pressing the pressing jig; thus, the plurality of glass capillary tubes 8 are simultaneously positioned and fixed in place.

The middle region of the upper surface of each glass capillary tube 8 is formed with a groove 7 for discharging the ultraviolet-curing adhesive agent and air bubbles contained therein. Such grooves 7 may be formed either at the time when the glass tubes are drawn before the glass capillary tubes 8 are fixed in the receiving and supporting recesses 8 formed in the base 12 or at the time when the adhesive fixing of the capillary tubes in the recesses 13 has been completed. It is preferable that the depth of the grooves 7 be not more than ½ of the inner diameter of the glass capillary tubes 8 in order to prevent the optical fibers 4 from escaping and to facilitate coaxial connection of the cores 1. Further, it is also desirable that the depth of said recesses 13 be equal to or greater than the wall thickness of the glass capillary tubes in order to ensure smooth insertion of the optical fibers 4 into the glass capillary tubes 8. The angle of inclination of the insertion paths 15 is selected according to the depth of the recesses 13. To ensure smooth advance of the front portions of the optical fibers 4 along the bottom surfaces of the insertion paths 15, the insertion paths 15 extending from the lateral end of the base 12 toward the ends of the glass capillary tubes 8 are made in the form of somewhat upwardly sloping guide surfaces, having no sudden change in level, for the optical fibers 4.

A description will now be given of the way the device of the present invention is used.

As many glass capillary tubes as there are optical fibers 4 which constitute a multi-core optical fibers 10 are prepared, and a suitable amount of ultraviolet-curing adhesive agent is injected into each glass capillary tubes 8 by utilizing such injection means as a syringe. When multi-core optical fibers 10 are to be connected, the light-tight packaging material is removed. And a suitable amount of adhesive agent (not shown) is applied to the outer peripheral surface of each glass capillary tube 8, whereupon the glass capillary tubes are orderly fitted in the receiving and supporting recesses 13 formed in the middle region of the upper surface of the base 12. Subsequently, an unillustrated pressing jig is lowered with the groove 16 serving as a guide until its lower surface depresses the upper surfaces of the glass capillary tubes 8, thereby positioning and fixing the glass capillary tubes 8 in the recesses 13 of the base 12 with a predetermined pitch. Thereafter, the optical fibers 4 of the multi-core optical fibers 10 are inserted into the respective opposite ends of the glass capillary tubes 8 each having the groove 7 for discharging the adhesive agent and air bubbles. In this state, ultraviolet rays are radiated from above the glass capillary tubes 8. The insertion of the optical fiber bodies 4 causes the excessive ultraviolet-curing adhesive agent to be discharged together with the air bubbles through the grooves 7, while the ultraviolet-curing adhesive agent remaining in the glass capillary tubes 8 is cured by irradiation with ultraviolet rays, whereby the optical fibers 4 are concentrically permanently connected end to end within the respective glass capillary tubes 8.

According to the present invention, the individual optical fibers which constitute ribbon-like multi-core optical fibers are smoothly inserted into glass capillary tubes by using the tapered front-edged separators. As a result, an increase in connection loss due to off-centered connection which has been a problem in the prior art is effectively avoided. With the device of the present invention used, the cores and clads of optical fibers are connected with a connection loss of about 0.2 dB, so that even in a limited environment as in explosion-proof and narrow places, conditions for high precision permanent connection can be secured quickly and easily.

While the invention has been particularly shown and described in reference to preferred embodiments thereof, it will be understood by those skilled in the art that changes in form and details may be made therein without departing from the spirit and scope of the invention.

What is claimed is:

1. An array splice connector for ribbon-like multi-core optical fibers, comprising:

a plurality of capillary tubes of ultraviolet-transmitting glass, each having an inner diameter slightly larger than an outer diameter of a clad of an optical fiber, and including tapered portions on the opposite ends of said capillary tubes for guiding optical fiber bodies, and a groove formed in a middle upper surface region of each of said capillary tubes for discharging bubbles and adhesive agent therefrom;

a base including recesses formed in a middle upper surface region thereof for receiving and supporting lower portions of tube walls of said glass capillary tubes; and a plurality of front-edged separators for guiding said optical fiber bodies into said capillary tubes, each respectively disposed at opposite ends of said receiving and supporting recess, said separators being disposed on said base with substantially the same pitch as that for said capillary tubes, wherein defined between adjacent separators are optical fiber insertion paths, each path having a width which increases with increasing distances from the opposite ends of each capillary tube.

2. An array splice connector for ribbon-like multi-core optical fibers as set forth in claim 1, wherein said base has an H-shaped cross-section, with a groove formed in a middle portion thereof for guiding a pressing jig when said jig advances when said glass capillary tubes are to be bonded.

3. An array splice connector for ribbon-like multi-core optical fibers as set forth in claim 1, wherein a distance between adjacent separators disposed on said base is dependent on said outer diameter of said optical fiber clad.

4. An array splice connector for ribbon-like multi-core optical fibers as set forth in claim 1, wherein top surfaces of said separators are above upper surfaces of said capillary tubes so as to prevent said optical fibers from leaving said insertion paths during insertion of said optical fibers through said separators.

* * * * *

UNITED STATES PATENT AND TRADEMARK OFFICE
CERTIFICATE OF CORRECTION

PATENT NO. : 5,024,505

DATED : June 18, 1991

INVENTOR(S) : JUNJI et al

It is certified that error appears in the above-identified patent and that said Letters Patent is hereby corrected as shown below:

On the cover page, after Item [76], the following should appear --Nippon Electric Glass Co., Ltd., Otsu-shi, Siga-ken, Japan--.

Signed and Sealed this

Twenty-sixth Day of January, 1993

Attest:

STEPHEN G. KUNIN

*Attesting Officer*    *Acting Commissioner of Patents and Trademarks*